(12) United States Patent
Markel

(10) Patent No.: US 9,296,633 B2
(45) Date of Patent: Mar. 29, 2016

(54) METHOD FOR MAKING SCULPTURAL INTERIOR IN A VESSEL AND VESSELS PRODUCED THEREBY

(71) Applicant: Jay Markel, Boulder, CO (US)

(72) Inventor: Jay Markel, Boulder, CO (US)

( * ) Notice: Subject to any disclaimer, the term of this patent is extended or adjusted under 35 U.S.C. 154(b) by 216 days.

(21) Appl. No.: 14/026,185

(22) Filed: Sep. 13, 2013

(65) Prior Publication Data

US 2015/0017351 A1  Jan. 15, 2015

Related U.S. Application Data

(60) Provisional application No. 61/845,594, filed on Jul. 12, 2013.

(51) Int. Cl.

| *C03B 9/32* | (2006.01) |
|---|---|
| *C03B 9/14* | (2006.01) |
| *C03B 9/33* | (2006.01) |
| *C03B 9/36* | (2006.01) |
| *B65D 1/02* | (2006.01) |
| *C03B 40/00* | (2006.01) |
| *D04B 37/00* | (2006.01) |
| *B44C 5/00* | (2006.01) |
| *B44C 5/06* | (2006.01) |

(52) U.S. Cl.
CPC ................ *C03B 9/32* (2013.01); *B65D 1/0207* (2013.01); *B65D 1/0223* (2013.01); *C03B 9/14* (2013.01); *C03B 9/33* (2013.01); *C03B 9/3645* (2013.01); *C03B 9/3672* (2013.01); *C03B 40/005* (2013.01); *D04B 37/00* (2013.01); *B44C 5/00* (2013.01); *B44C 5/06* (2013.01); *Y10T 428/131* (2015.01)

(58) Field of Classification Search
CPC .......... C03B 9/325; C03B 9/33; C03B 9/335; C03B 9/34; C03B 40/005
See application file for complete search history.

(56) References Cited

U.S. PATENT DOCUMENTS

| 3,815,863 A | * | 6/1974 | Andeweg | ................ B29C 33/50 249/152 |
|---|---|---|---|---|
| 5,391,214 A | * | 2/1995 | Nakagawa | ............... C03B 35/04 118/324 |

FOREIGN PATENT DOCUMENTS

| DE | 19521117 A1 | * | 12/1996 | ................ C03B 9/32 |
|---|---|---|---|---|
| EP | 1894899 A1 | * | 3/2008 | ............ C03B 23/207 |

* cited by examiner

*Primary Examiner* — Lisa Herring

(57) ABSTRACT

The invention provides a method of making a vessel having a sculptural interior, comprising attaching a textile core to the air inlet port of an I.S. machine, inserting a gob of molten glass into a mold to surround the textile core, applying compressed air to press the molten glass around the textile core, applying compressed air to inflate the textile core creating the bottle, allowing the bottle to cool sufficiently to withdraw the core from the bottle, and withdrawing the textile core from the bottle.

8 Claims, 2 Drawing Sheets

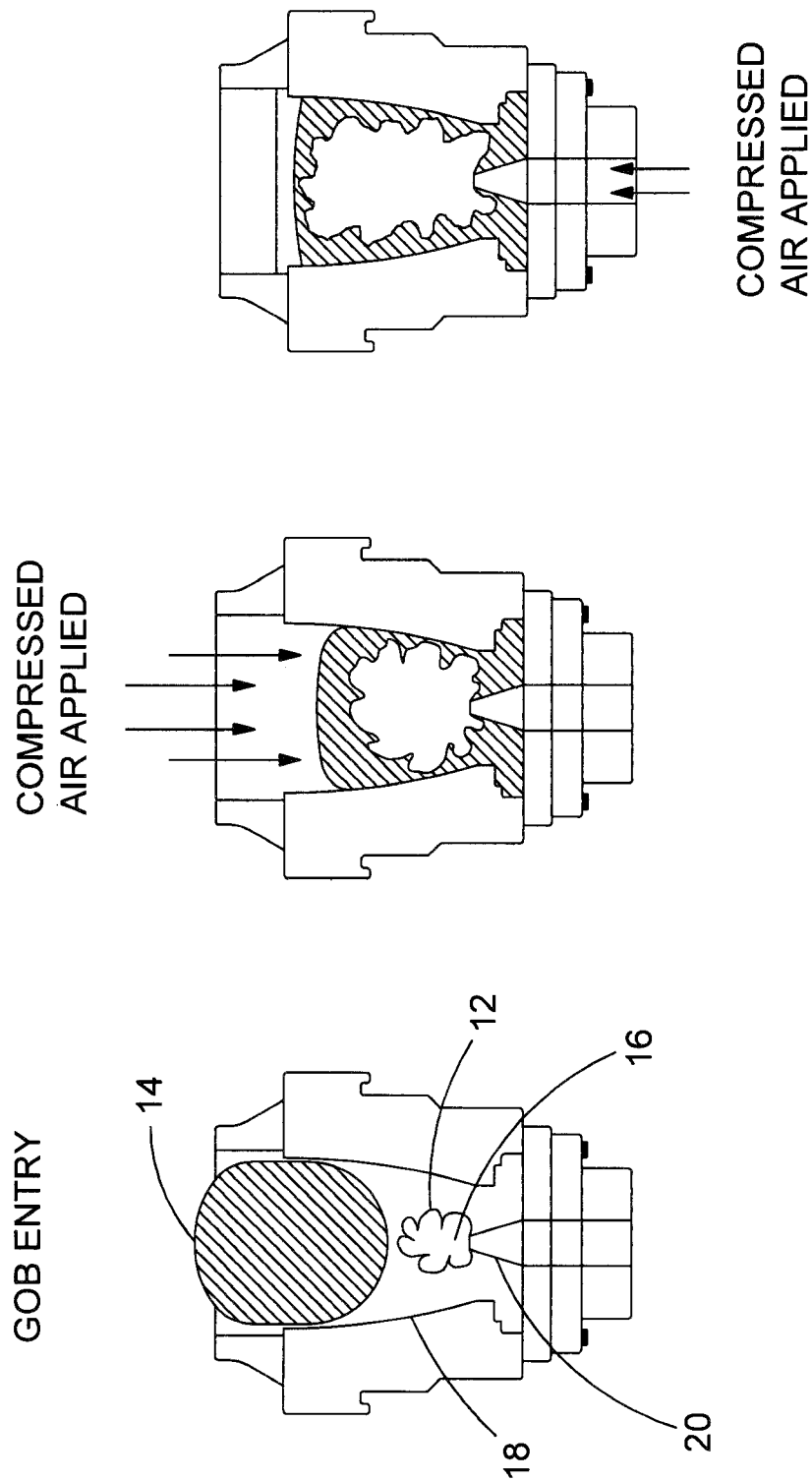

METHOD FOR MAKING SCULPTURAL INTERIOR IN A VESSEL AND VESSELS PRODUCED THEREBY

CLAIM OF PRIORITY

This patent application claims priority under 35 USC 119 (e) (1) from U.S. Provisional Patent Application Ser. No. 61/845,594 filed Jul. 12, 2013, of common inventorship herewith entitled, "Method for Making Sculptural Interior in a Vessel."

FIELD OF THE INVENTION

The present invention pertains to the field of glass vessel making, and more specifically to the field of making a glass vessel having a sculptural interior.

BACKGROUND OF THE INVENTION

The prior art has put forth several designs for making glass vessels. Among these are:

U.S. Pat. No. 8,333,287 to Michael J. Lonsway, et al, describes a method of making a bottle having a neck with internal embossments. The bottle produced thereby is a long-neck glass or metal bottle of one-piece integrally formed construction having a body with a closed based and a shoulder at an end of the body remote from the base, and a neck extending from the shoulder along an axis and terminating in a neck finish for attachment of a closure. The bottle neck includes at least one internal embossment for affecting the flow of liquids from the body through the neck.

European Patent Application EP 1894899 to Yves Brocheton describes glass articles and a process for making the same wherein the novel glass articles produced thereby comprise a soda-lime glass part and a borosilicate glass part fused to the soda-lime glass part wherein the glass can be colored by the addition of various chemical compositions to the borosilicate glass for creating colored glass articles such as high-end perfume bottles.

European Patent Specification EP 0598981 to Manabu Nakagawa et al describes methods and apparatus for manufacturing glass bottles comprising a Hot End coating process for treating the surface of the glass before annealing.

U.S. Pat. No. 4,008,063 to Heinz Kramer et al describes an apparatus for producing blown hollow glass objects having an optical interior produced by pressing a plunger against a heated glass blank which has been inserted into a hollow mold cavity.

U.S. Pat. No. 6,405,887 to David W. Cargile describes a blow molded container having reinforcement ribs and method and apparatus for making the same.

None of these references describe the present invention, which is a method for making a glass vessel having a sculptural interior.

SUMMARY OF THE INVENTION

It is an object of the present invention to provide a method for making a vessel having a sculptural interior.

It is a further object of the present invention to provide a method for making a glass vessel having a sculptural interior.

It is a still further object of the present invention to provide a vessel having a sculptural interior.

It is a still further object of the present invention to provide a method of making a textile core to produce a sculptural interior in a vessel wherein the textile core can be used for more than one vessel.

It is a still further object of the present invention to provide a textile core to produce a sculptural interior in a vessel wherein the textile core can be used for more than one vessel.

It is a still further object of the present invention to provide a method of making a textile core using CAD computerized knitting.

It is a still further object of the present invention to provide a method of making a vessel having a sculptural interior using a textile core wherein the textile core is made using CAD computerized knitting.

It is a still further object of the present invention to provide a vessel having a sculptural interior wherein the sculptural interior was made by using a textile core and the textile core was made using CAD computerized knitting.

It is a still further object of the present invention to provide a textile core formed by sewing fabric, fabricated, knitted or crocheted.

The use of an inflated textile core allows the creation of a unique specific predetermined interior space. The method taught herein is most particularly useful for luxury perfume bottles, but also has a much broader potential application including the molding and casting of art bronzes, and industrial iron, steel, stainless steel, and high tech metal casting. The present invention provides a method of making a vessel having a sculptural interior, comprising attaching a textile core to the air inlet port of an I.S. machine, or any machine using blow and blow or press and blow methods inserting a gob of molten glass into a mold to surround the textile core, applying compressed air to press the molten glass around the textile core, applying compressed air to inflate the textile core thus creating the bottle, allowing the bottle to cool enough to withdraw the textile core from the bottle, withdraw the textile core.

BRIEF DESCRIPTION OF THE DRAWINGS

FIG. 1 shows a schematic depiction of the blow and blow process of the present invention showing gob entry into a chamber having a deflated textile core.

FIG. 2 shows a schematic depiction of the blow and blow process of the present invention showing compressed air applied to the gob.

FIG. 3 shows a schematic depiction of the blow and blow process of the present invention showing compressed air applied to inflate the textile core.

DETAILED DESCRIPTION OF THE INVENTION

Figure 4:
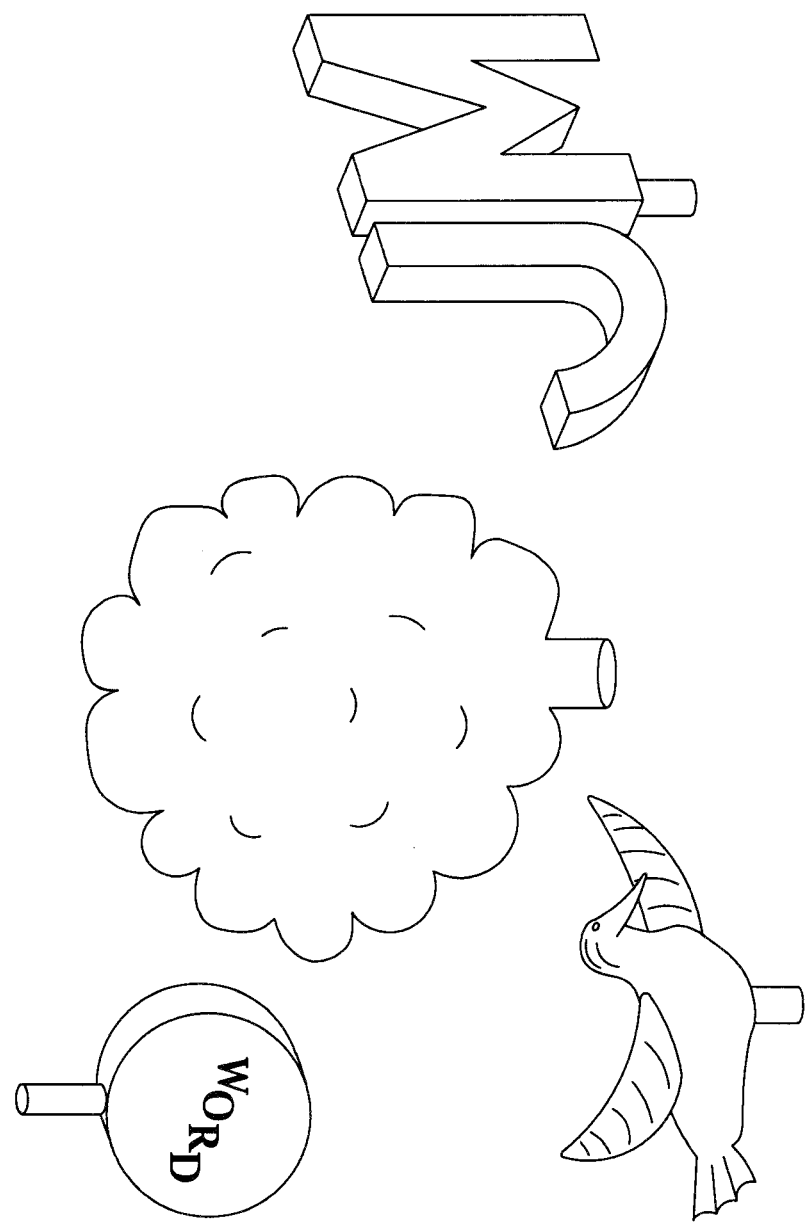
FIG. 4 shows three exemplary shapes for the textile core including cloud, initials and bird. Although three specific examples are given, it is contemplated that a wider variety of shapes is suitable.

The present invention teaches a method for making a bottle having a sculptural interior by using an inflatable textile core having a predetermined shape. Material suitable for use as the inflatable textile core includes, but is not limited to high temperature textiles, such as carbon fiber, ceramic, alumina, mullite, silica, or any other suitable material, woven, knitted, crocheted, felted, sewn, assembled or otherwise configured. FIG. 1 shows a woven, or crocheted form of high temperature yarn, of z or s spun thread, to create a textile core 12 or bladder, inflated in the initial inverted position of the blow and blow, commercial glass bottle production technique. The gob or gobs 14 is pressed around the inflated fiber core 12 to create an internal form 16 capable of being specific and very different from the external form. With or without the inversion of the bottle, and second blow of the parison, the mold can be heated, blown, and or vacuum suctioned to fully fill the glass around the core for the neck, and full side fill of the mold.

An embodiment comprises the use of a computer woven, knitted or crocheted form bladder creating the parison, or internal void or bladder having a specific predetermined sculptural shape. This bladder 12 is herein referred to also as the textile core, or knitted inflatable core. This radically differentiates this bottle making technique from the results obtainable from any other historic blow and blow fabricated bottle technique.

Essentially, any blow and blow bottle either has an interior matching the exterior, or has an air formed bubble, or roundish shape brought about by various injections of air. In contrast, the "sculpted" inflatable core 12 of the present invention wherein the gob 14 is drawn around the form, the interior shape exists separate from any restraints of the exterior form. Heretofore, this effect could only be obtained in unique art technique castings, or machined, laser, or chemical forming of the interior.

FIG. 4 shows a representative sampling of shapes suitable for the textile core. Although shapes shown include initials, a cloud shape, and a bird shape, it is contemplated that any shape is suitable for use in this invention including shapes from nature such as flowers, birds, trees, leaves, tree bark, fish, frogs, reptiles, mammals, insects or any other contiguous shape. Suitable shapes also include geometric or architectural forms.

The novelty of using an inflated textile core 12 of a specific sculptural form allows for virtually any imaginable form to exist within the bottle. This is particularly desirable for luxury mass produced perfume bottles. It is contemplated that the textile core can be used for multiple bottles.

Surfacing of the core can alter the surface of the woven core from its natural texture, and, or allow for mineral coloring agents to melt into the glass gob.

The bladder or textile core 12 to be used in the present method can be used in conjunction with CAD, computerized knitting, crocheting, and several blow and blow techniques. The bladder 12 can be attached to the air injection port through a custom connection of the textile to the mold by any suitable means, such as by use of a clamp, fixated fitting, retaining system or tapered nozzle 20, for example. Compressed air can be applied from the top, as shown in FIG. 2, pressing the gob around the core 12. The core 12 is inflated by compressed air applied from the bottom, as shown in FIG. 3. The nozzle 20 or air entry port serves to form the neck of the bottle.

The ability to collapse the inflatable fabric core 12 allows for a clean evacuation of the core 12 through the mouth of the bottle. It is contemplated that the fabric core 12 can be reused for more than one bottle. This is the key to allowing both the unique and independent form, and also in allowing for a one piece bottle that requires only a stopper or mist dispenser.

The method of the present invention applies to an I.S. machine which transforms a gob into a glass bottle, well known by the person of ordinary skill in the art of glass bottle making.

Prior to, or simultaneously with or subsequently to the injection of a gob into the bottle mold, the fiber inflatable core 12 is inflated. The blow of the gob 14 pushes the molten glass around the core 12. This is shown in FIG. 2.

FIG. 3 shows a secondary blow of compressed air completing the form 14 surrounding the core 12. Inversion may or may not be used depending on the form of both the core shape, and external bottle shape.

Pulling the glass completely to the sides of the mold 18 may be done with vacuum voiding of the mold or additional pressure in the initial inverted position. This method can be used in conjunction with multi gob entry, a secondary heating, and or blowing of the gob, and or drawing a vacuum on the mold to complete the fill, and stabilize the inflated core. In an embodiment, one or more glass rods (not shown) positioned in the main mold body can be used along with multi gob entry to stabilize the inflatable fabric core 12. These rods are of a dimension and glass similarity such that they can melt into the body of molten glass in such time as it takes to stabilize the body of molten glass around the inflated core. This glass stabilizing rod dimension varies according to the bottle size, thickness, and blow temperature of the gob.

The inflation of the fabric core remains constant until the bottle is formed. After cooling sufficiently, the deflated fabric core 12 can be withdrawn through the neck of the bottle for re-use. The inflation for interior core, and withdrawal of all core material to form the parison, or bottle's interior form is distinctive from what is possible from just the injection of air, and is a novel feature of the present invention.

While abundant additional opportunities for texture, surfacing, and coloration are possible, they all hinge on the concept of an inflatable fabric core in forming the void, or parison within the bottle.

In an embodiment, the present invention includes clamps for gathering, and holding in position of the fabric core, variations of heating, gob insertion, and blowing of the gob, and, or position of the bottle in forming, or equipment used in annealing and finishing of the bottle.

Use of inflatable fabric sculptural cores have not previously been used in industrial blow and blow glass bottle mass production. The inflatable fabric core can be reusable.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A method of making a bottle having a sculptural interior, comprising attaching a textile core to an air inlet port of an I.S. machine, inserting a gob of molten glass into a mold to surround the textile core, applying compressed air to press the molten glass around the textile core, applying compressed air to inflate the textile core to create the interior of the bottle, allowing the bottle to cool, and withdrawing the textile core from the bottle.

2. The method of claim 1 wherein the textile core includes, but is not limited to high temperature textiles, such as carbon fiber, ceramic, alumina, silica or mullite.

3. The method of claim 1 wherein compressed air to inflate the bottle is applied through a tapered nozzle.

4. The method of claim 1 wherein the textile core is reusable.

5. The method of claim 1, wherein the shape of the textile core is selected from the group consisting of: initials, word, cloud shape, and bird shape.

6. The method of claim 1, wherein the shape of the textile core is selected from the group consisting of flowers, trees, leaves, tree bark, fish, frogs, reptiles, mammals, insects, geometric shapes, and any natural animal, vegetable, mineral form and architectural shapes.

7. The method of claim 1 wherein the textile core is knitted, woven, sewn, assembled, fabricated or crocheted.

8. The method of claim 1 wherein the textile core is made by a process including computerized knitting.

* * * * *